(12) United States Patent
Lin

(10) Patent No.: US 12,371,128 B1
(45) Date of Patent: Jul. 29, 2025

(54) HUB GEARING SYSTEM OF A BICYCLE

(71) Applicant: Enerstro Tech. Corp., Yunlin County (TW)

(72) Inventor: Po-Ju Lin, Taichung (TW)

( * ) Notice: Subject to any disclaimer, the term of this patent is extended or adjusted under 35 U.S.C. 154(b) by 0 days.

(21) Appl. No.: 18/420,820

(22) Filed: Jan. 24, 2024

(51) Int. Cl.
  *B62M 25/08* (2006.01)
  *B62M 11/04* (2006.01)
(52) U.S. Cl.
  CPC ............ *B62M 25/08* (2013.01); *B62M 11/04* (2013.01)
(58) Field of Classification Search
  CPC ..... B62M 11/04; B62M 25/08; F16H 25/122; F16H 25/125; B62N 2025/006
  See application file for complete search history.

(56) References Cited

U.S. PATENT DOCUMENTS

| | | | | |
|---|---|---|---|---|
| 4,947,703 | A * | 8/1990 | Bergles | B62M 25/04 474/82 |
| 10,300,986 | B2 * | 5/2019 | Emura | B62M 9/134 |
| 10,563,762 | B2 * | 2/2020 | Hasegawa | F16H 3/32 |
| 2023/0159134 | A1 * | 5/2023 | Carlier | B62J 45/412 474/70 |

* cited by examiner

*Primary Examiner* — Gregory Robert Weber
(74) *Attorney, Agent, or Firm* — Bruce Stone LLP; Joseph A. Bruce

(57) ABSTRACT

A bicycle-used hub gearing system includes a hub gearing and a rotational element. The hub gearing includes a hub and a shift rod formed with a first end located in the hub and a second end located out of the hub. The rotational element includes a slope in contact with the second end of the shift rod. The slope includes various gear points for contact with of the second end of the shift rod, thereby keeping the first end of the shift rod in various depths in the hub corresponding to various gears of the hub gearing.

8 Claims, 5 Drawing Sheets

HUB GEARING SYSTEM OF A BICYCLE

BACKGROUND OF INVENTION

1. Field of Invention

The present invention relates to a bicycle and, more particularly, to a hub gearing system of a bicycle.

2. Related Prior Art

Some bicycles are equipped with hub gearing systems. A conventional hub gearing system includes a hub gearing, a converting element, a shift lever and a shift cable. The hub gearing includes a hub of a rear wheel of a bicycle, a gear set (such as an epicyclic gearing) and a shift rod. The shift lever is supported on a handlebar of the bicycle. The converting element is supported on a frame of the bicycle, adjacent to the hub. The shift cable includes an end connected to the shift lever and another end connected to the converting element. The shift rod includes an end connected to the gear set in the hub and another end connected to the converting element out of the hub. Thus, the shift lever is operable to shift the gear set to various gears via the shift cable, the converting element and the shift rod. The gear set is free of rain, dust, grease and oil for being located in the hub. Hence, the gear set is not vulnerable to rust or damage. However, the shift between the gears by operating the shift lever to move the converting element via the shift cable is imprecise.

The present invention is therefore intended to obviate or at least alleviate the problems encountered in the prior art.

SUMMARY OF INVENTION

It is the primary objective of the present invention to provide a precision hub gearing system.

To achieve the foregoing objective, the precision hub gearing system includes a hub gearing and a rotational element. The hub gearing includes a hub and a shift rod formed with a first end located in the hub and a second end located out of the hub. The rotational element includes a slope in contact with the second end of the shift rod. The slope includes various gear points for contact with of the second end of the shift rod, thereby keeping the first end of the shift rod in various depths in the hub corresponding to various gears of the hub gearing.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
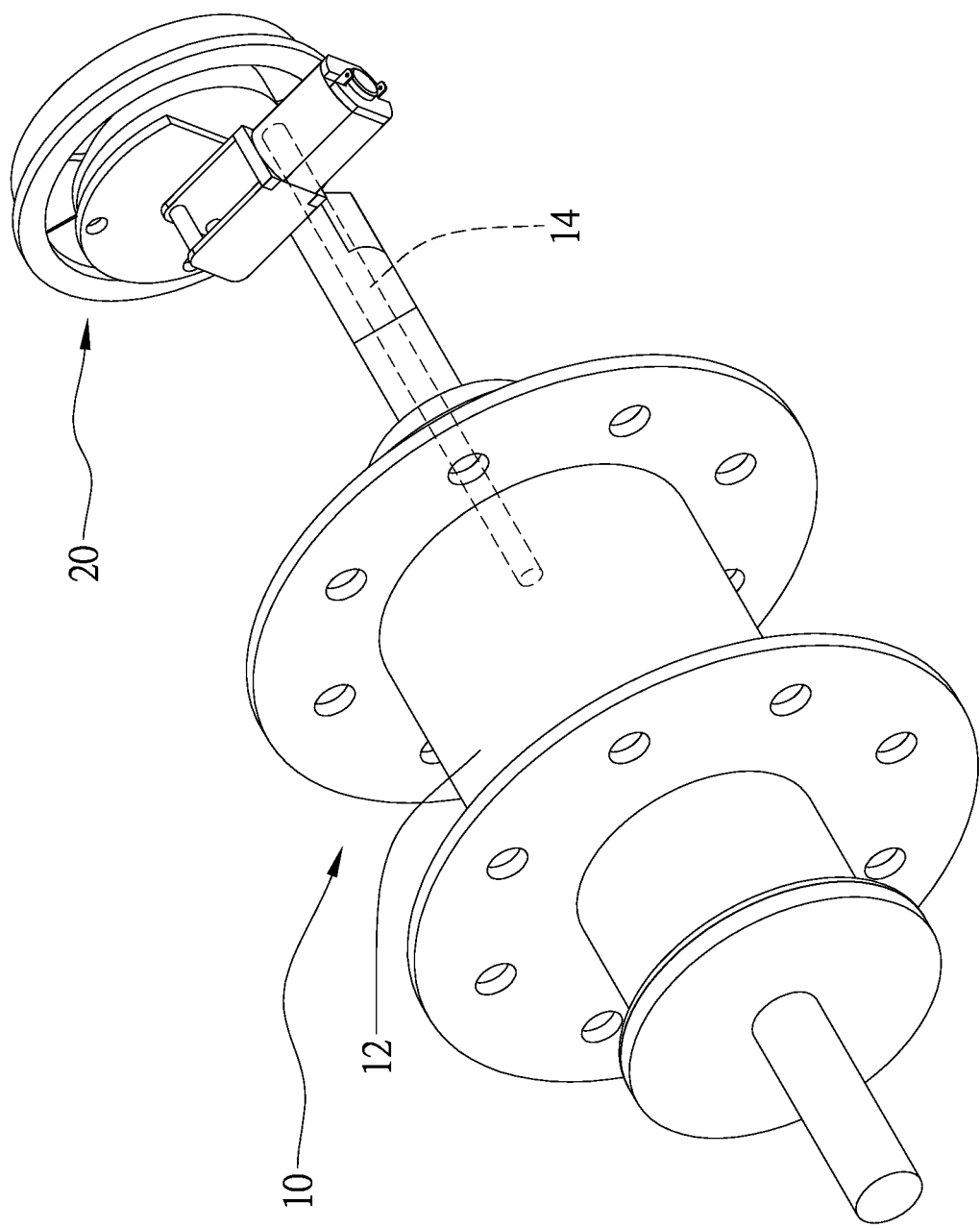
FIG. 1 is a perspective view of a hub gearing system according to the preferred embodiment of the present invention.

Referring to FIG. 1, a hub gearing system includes a hub gearing 10, a control unit 20 and a shift lever (not shown) according to the preferred embodiment of the present invention. As described in the RELATED PRIOR ART, the shift lever is supported on a handlebar of a bicycle (not shown). The shift lever will not be further described in detail for being conventional.

As described in the RELATED PRIOR ART, the hub gearing 10 includes a hub 12 of a rear wheel of a bicycle, a gear set (not shown), a shift rod 14 (FIGS. 3 to 5) and a spring (not shown). The gear set such as an epicyclic gearing is inserted in the hub 12. The shift rod 14 includes a first end connected to the gear set in the hub 12 and a second end located out of the hub 12. The spring tends to push the shift rod 14 from the hub 12. The hub gearing 10 will not be further described in detail for being conventional.

Figure 2:
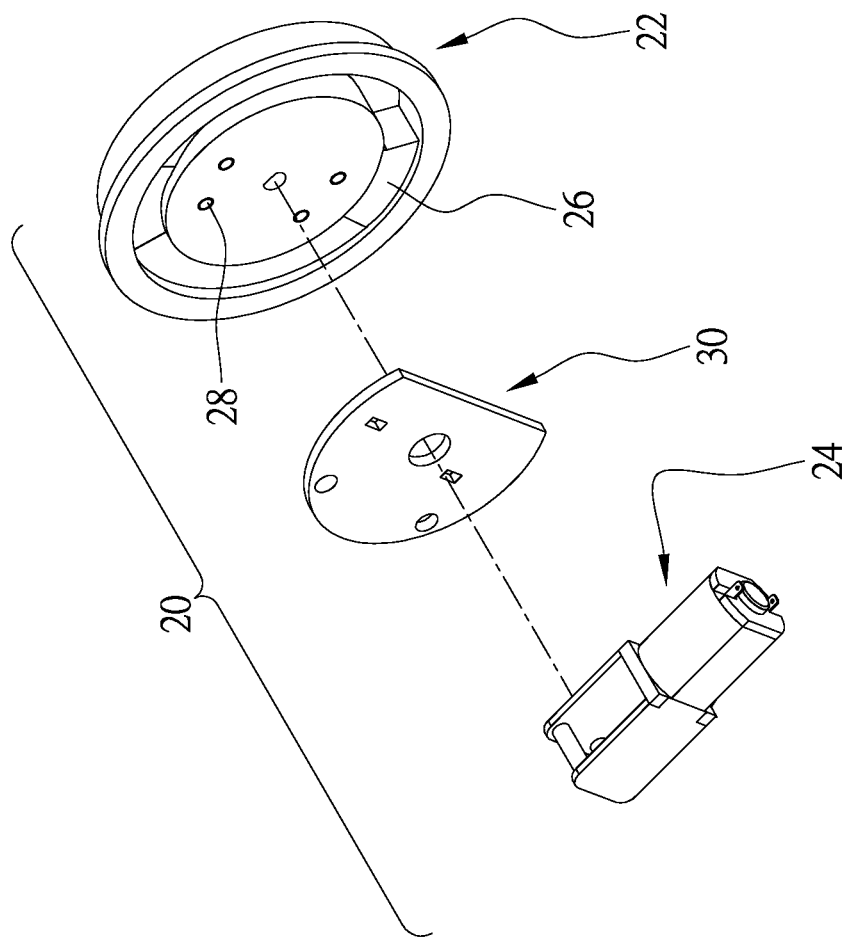
FIG. 2 is an exploded view of a control unit of the hub gearing system shown in FIG. 1.

Referring to FIG. 2, the control unit 20 includes a rotational element 22 and a motor 24. The rotational element 22 is a turnplate in the preferred embodiment. The rotational element 22 can be a cam in another embodiment.

The rotational element 22 includes an arched slope 26 extending on a first face. In the preferred embodiment, the arched slope 26 is an annular slope, thereby forming a wall or (or "shoulder") between a highest point of the arched slope 26 (measured from the first face) and a lowest point of the arched slope 26. The arched slope 26 is in contact with the second end of the shift rod 14.

Figure 3:
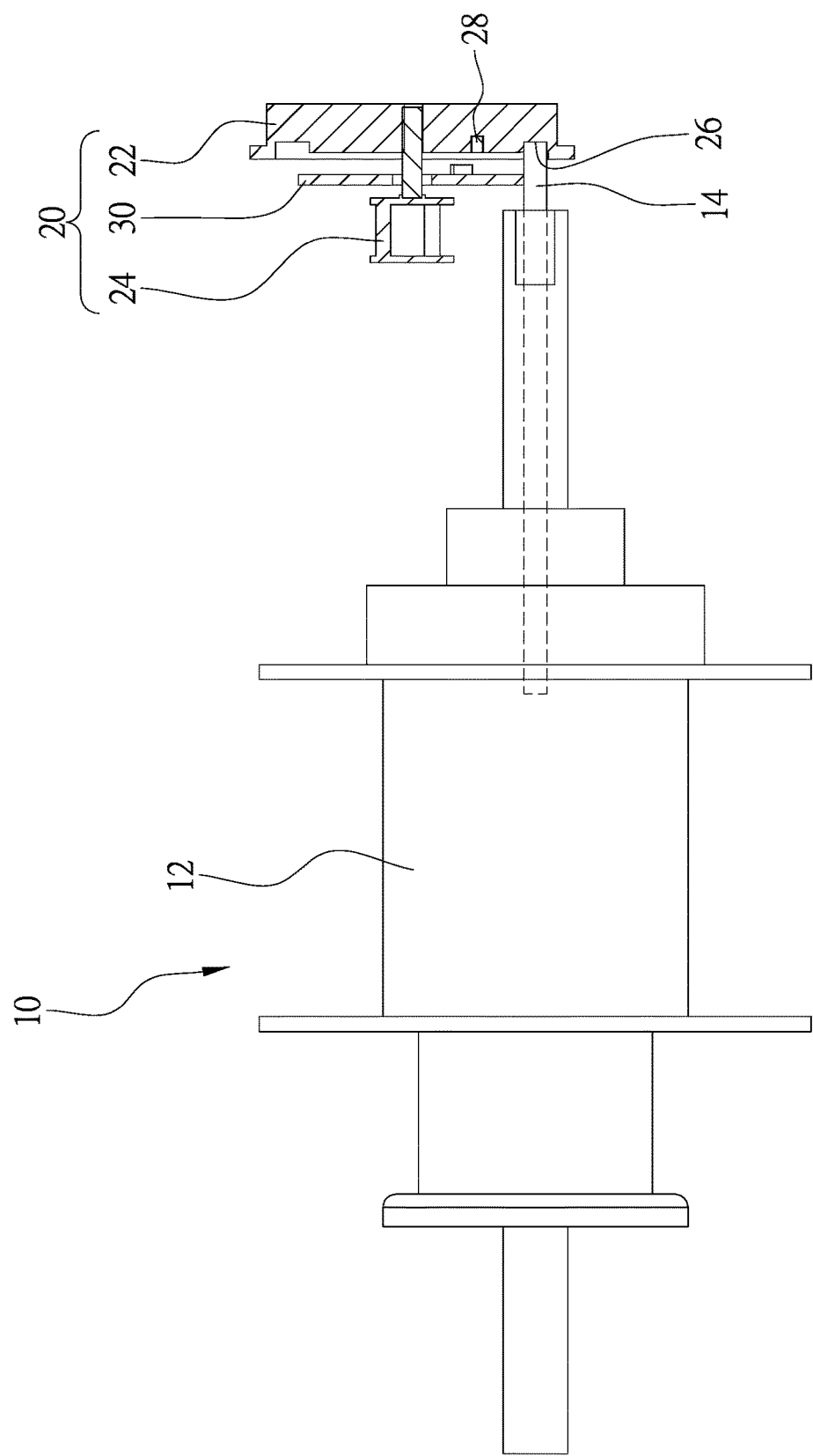
FIGS. 3 through 5 are cross-sectional views of the hub gearing system shown in FIG. 1 in various gears.
Figure 4:
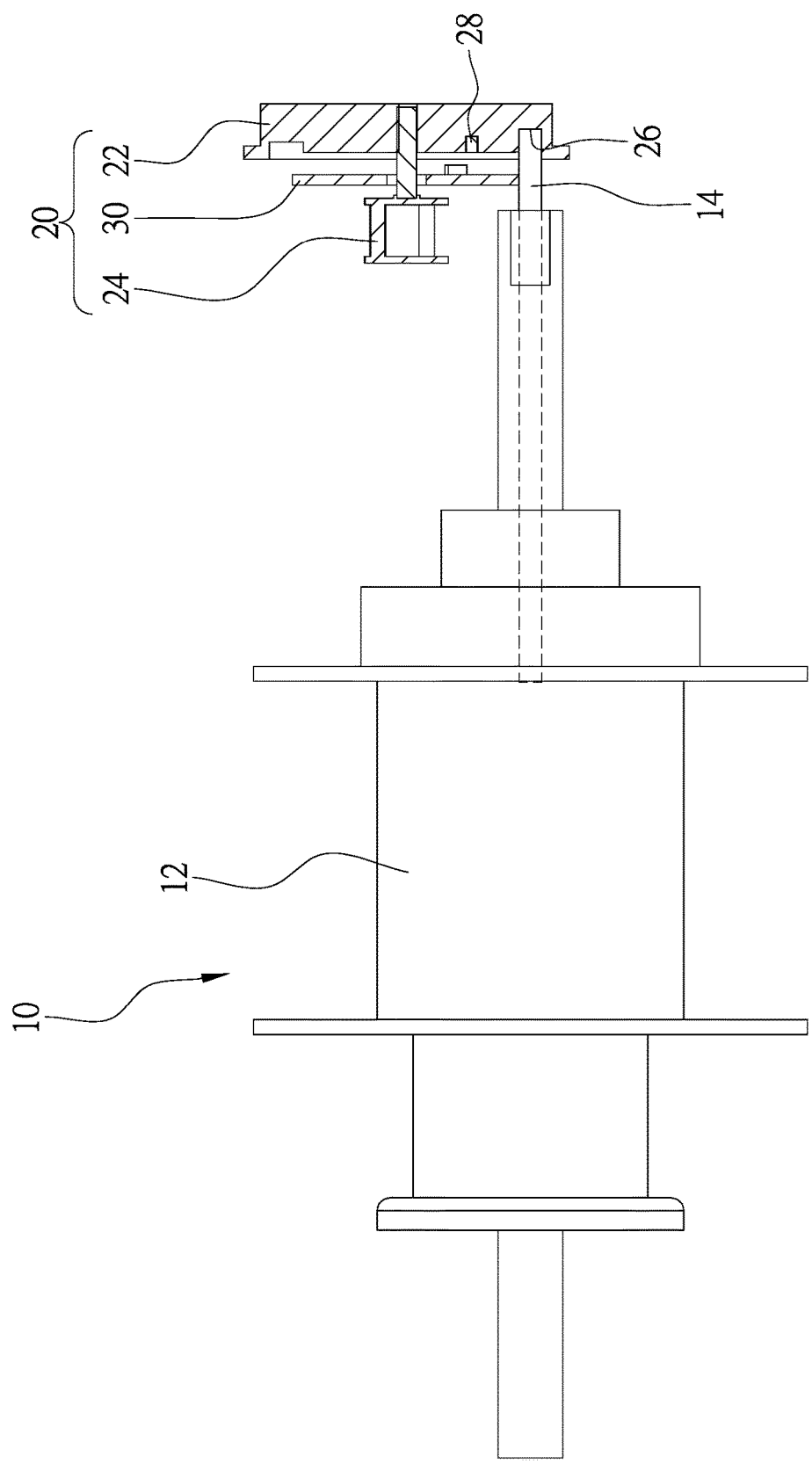
Figure 5:
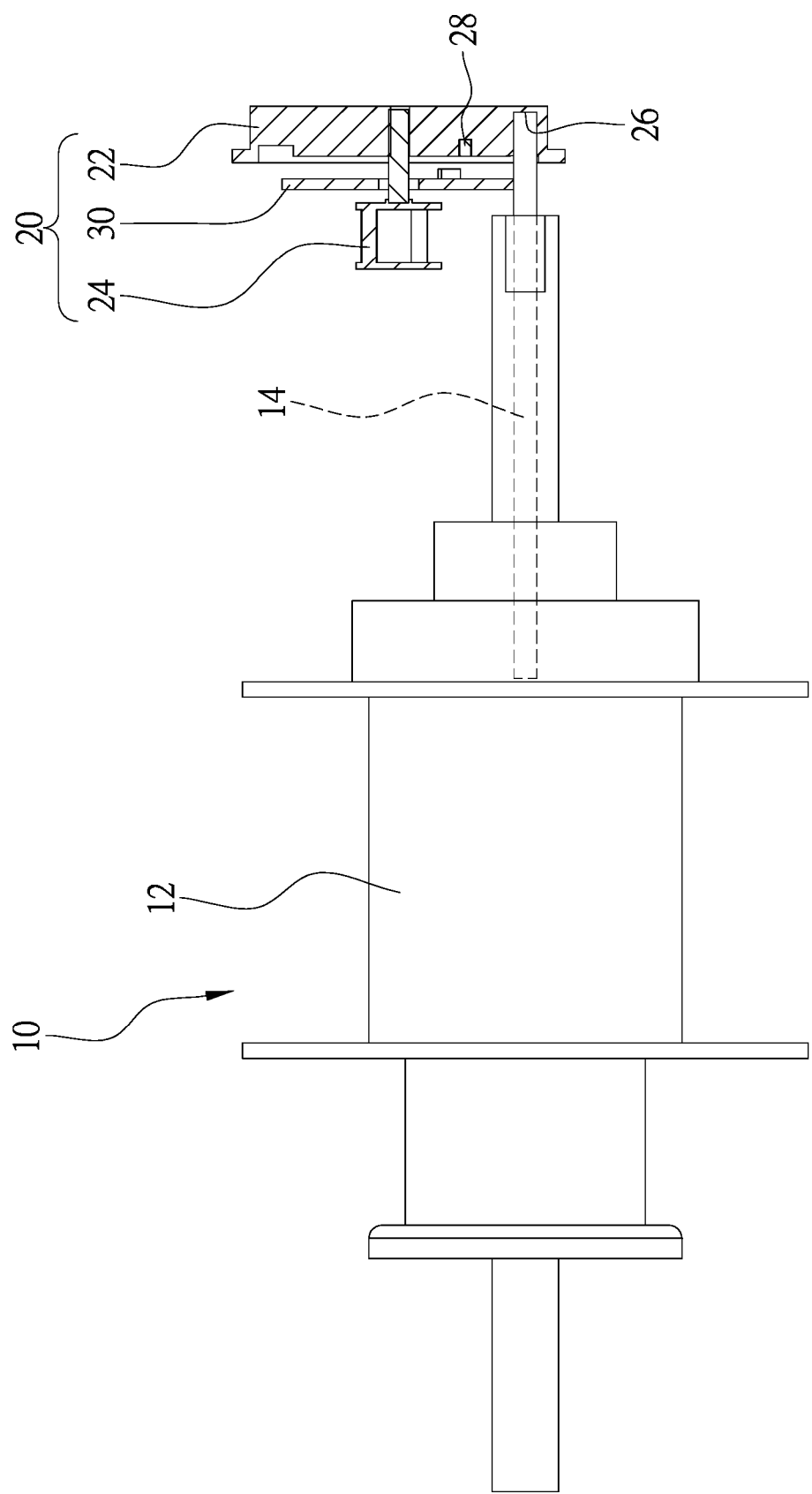

The rotational element 22 is supported on a frame of the bicycle (not shown), adjacent to the hub 12 (FIG. 3). The second end of the shift rod 14 contacts different points of the arched slope 26 so that the first end of the shift rod 14 reaches different depths in the hub 12. Thus, the hub gearing is shifted to different gears (FIGS. 3 through 5).

The motor 24 is an electrically or mechanically connected to the shift lever. In the preferred embodiment, the motor 24 is electrically connected to the shift lever. To this end, a first transceiver (not shown) is electrically connected to the shift lever, and a second transceiver (not shown) is electrically connected to the motor 24. Thus, the shift lever is operable to make the motor 24 rotate in two opposite directions, thereby causing the points of the arched slope 26 to contact the second end of the shift rod 14. Hence, the hub gearing 10 is shifted between the gears.

The points of the arched slope 26 can be referred to as the "gear points" corresponding to the gears of the hub gearing 10. For example, the arched slope 26 includes three gear points corresponding to three gears of the hub gearing 10. Magnets 28 are located on the first face of the rotational element 22 corresponding to the gear points of the arched slope 26. That is, each of the magnets 28 is located corresponding to one of the gears of the hub gearing 10. Moreover, a sensor 30 is electrically connected to the motor 24.

Referring to FIG. 3, on sensing the first magnet 28, the sensor 30 stops the motor 24, thereby stopping the rotational element 22. Thus, the first gear point of the arched slope 26 and the spring of the hub gearing 10 together keep the second end of the shift rod 14 in the first depth in the hub 12, thereby keeping the hub gearing 10 at the first gear corresponding to the first magnet 28.

Referring to FIG. 4, on sensing the second magnet 28, the sensor 30 stops the motor 24, thereby stopping the rotational element 22. Thus, the second gear point of the arched slope 26 and the spring of the hub gearing 10 together keep the second end of the shift rod 14 in the second depth in the hub 12, thereby keeping the hub gearing 10 at the second gear corresponding to the second magnet 28.

Referring to FIG. 5, on sensing the third magnet 28, the sensor 30 stops the motor 24, thereby stopping the rotational element 22. Thus, the third gear point of the arched slope 26 and the spring of the hub gearing 10 together keep the second end of the shift rod 14 in the third depth in the hub 12, thereby keeping the hub gearing 10 at the third gear corresponding to the third magnet 28.

Preferably, the arched slope 26 is made by cutting an annular slant groove in the first face of the rotational element 22 (FIG. 2). Thus, the lowest point of the arched slope 26 is located corresponding to a deepest point of the annular groove. The highest point of the arched slope 26 is located corresponding to a shallowest point of the annular groove. The annular groove is defined between two annular lateral faces that keep the second end of the shift rod 14 on the arched slope 26.

In another embodiment, the arched slope 26 is an edge of an annular wall extending from the first face of the rotational element 22.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A hub gearing system comprising:
    a hub gearing comprising a hub and a shift rod a first end located in the hub and a second end located out of the hub; and
    a rotational element being rotatable about an axis parallel to the shift rod and comprising a slope in contact with the second end of the shift rod, wherein the slope comprises various gear points for contact with of the second end of the shift rod, thereby keeping the first end of the shift rod in various depths in the hub corresponding to various gears of the hub gearing.

2. The hub gearing system according to claim 1, wherein the gear points of the slope are located at different heights measured from a first face of the rotational element.

3. The hub gearing system according to claim 1, wherein the slope is formed by cutting a groove in a first face of the rotational element.

4. The hub gearing system according to claim 1, wherein the slope is an arched slope.

5. The hub gearing system according to claim 1, wherein the slope extends in a circle.

6. The hub gearing system according to claim 1, further comprising a motor for rotating the rotational element.

7. The hub gearing system according to claim 6, further comprising a sensor for producing a signal for stopping the motor on sensing the contact of one of the gear points of the rotational element with the second end of the shift rod.

8. The hub gearing system according to claim 7, further comprising magnets located on a first face of the rotational element corresponding to the gear points of the rotational element, wherein the sensor produces a signal for stopping the motor on sensing one of the magnets.

* * * * *